(12) United States Patent
Shin

(10) Patent No.: US 6,381,287 B1
(45) Date of Patent: Apr. 30, 2002

(54) DATA SLICER

(75) Inventor: Jong Min Shin, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/418,015

(22) Filed: Oct. 14, 1999

(30) Foreign Application Priority Data

Oct. 15, 1998 (KR) .............................. 98-43216

(51) Int. Cl.[7] .................. H04L 27/06; H04N 7/00
(52) U.S. Cl. .......................... 375/316; 348/468
(58) Field of Search .......................... 375/316, 286, 375/321, 317; 348/487, 398, 468, 563, 569

(56) References Cited

U.S. PATENT DOCUMENTS 5,483,289 A * 1/1996 Urade et al. .............. 348/468
5,760,844 A * 6/1998 Jorden ..................... 348/691

* cited by examiner

Primary Examiner—Chi Pham
Assistant Examiner—Khai Tran
(74) Attorney, Agent, or Firm—Birch, Stewart, Kolasch & Birch, LLP

(57) ABSTRACT

A data slicer, which detects caption information by receiving a broadcasting signal included in the caption information, includes an analog-to-digital converter for sampling an input analog signal to convert it into a digital signal, a caption signal reader for determining upper/lower levels which are reference levels from the digital signal and detecting a line signal in which caption data is inserted by applying a successive high/low detection manner to each of compared result between the digital signal and upper/lower level signals, a comparator for respectively comparing the digital signal with the upper/lower level signals and outputting the compared results to the caption signal reader, a data reader for outputting actual caption data by applying the successive high/low detection manner to the output of the comparator when the line signal in which the caption data is inserted is detected by the caption signal reader, and a controller for controlling the detection of the line signal in which the caption data is inserted, and a reading of the actual caption data.

21 Claims, 7 Drawing Sheets

FIG. 9

| successive high discriminator | successive low discriminator | results |
|---|---|---|
| high | not low | 1 |
| not high | low | 0 |
| high | low | × |

DATA SLICER

BACKGROUND OF THE INVENTION

1. Field of the Invention

The present invention relates to a television(TV) which receives a broadcasting signal having caption data, and more particularly, to a data slicer which detects caption data.

2. Background of the Related Art

A caption television (TV) is generally adapted to display a composite video blanking signal (CVBS), or a composite video signal, from a broadcasting station through a sequence of signal processes, wherein the CVBS includes additional information or character information for hearing impaired people, which is in synchronization with an audio signal.

In the caption TV, caption data is placed on an odd or even field line 21 in a vertical blanking interval (VBI) of the CVBS, referred to hereinafter as "NTSC VBI line 21".

With reference to FIG. 1, the NTSC VBI line 21 generally has a signal characteristic composed of a horizontal synchronization part, color burster, 7-cycle sinusoidal wave, 001-bit start bit and 2-bite caption data, wherein first and second characters of the 2-bite caption data are generally composed of 7-bit pure data and 1-bit parity bit, respectively.

The NTSC VBI line 21 may be transmitted via a video tape, TV air waves or cable. However, the NTSC VBI line 21 is subjected to considerable distortion due to a tension relaxation and temperature variation of the video tape resulting from frequent copies and various noises on channels of the TV air waves and cable. Such distortion results in a glitch or phase error on the NTSC VBI line 21.

A data slicer is the kernel in determining the performance of a caption decoder (for example, an NTSC closed caption decoder), because it can detect desired caption data from the distorted NTSC VBI line 21.

There is shown in block form the construction of an example of a conventional data slicer. A 7-cycle sinusoidal wave on the NTSC VBI line 21 is used for the frequency/phase locking of a phase locked loop (PLL) so that the caption data on the NTSC VBI line 21 can be detected by a separate synchronization signal locked to a frequency of 503 KHz.

In another example of a conventional data slicer, the 7-cycle sinusoidal wave on the NTSC VBI line 21 is used as a sample/hold interval for the detection of a reference voltage for the high/low determination. In this data slicer, values of over-sampled data regions are compared with the reference voltage and the caption data on the NTSC VBI line 21 is detected on the basis of the number of 1s and 0s as a result of the comparison. However, the conventional data slicers have the following problems.

Firstly, in the data slicer where the 7-cycle sinusoidal wave on the NTSC VBI line 21 is used for the frequency/phase locking, a separate PLL is required only for a sampling of the NTSC VBI line 21, resulting in an increase in the size of hardware (H/W). Further, because the locking is effected for a short period of seven cycles, the PLL must have a relatively high performance, thereby increasing the cost of H/W. Moreover, in the case where the 7-cycle sinusoidal wave itself is subjected to deterioration, a faulty operation occurs in the data slicer.

Secondly, in the data slicer where the 7-cycle sinusoidal wave on the NTSC VBI line 21 is used as the sample/hold interval for the detection of the reference voltage for the high/low determination, 1/0 counting and comparing operations are performed, resulting in a degradation in noise coping capability. As a result, the data slicer may misrecognize a waveform distorted in an analogous form to an NTSC caption signal as the NTSC caption signal, thereby causing a faulty operation.

SUMMARY OF THE INVENTION

Accordingly, the present invention is directed to a data slicer that substantially obviates one or more of the problems due to limitations and disadvantages of the related art.

An object of the present invention is to provide a data slicer which detects 7-cycle sinusoidal wave, a start bit and actual caption data in a successive high/low detection manner, so that a faulty operation due to noises can be prevented from occurring, resulting in an increase in the reliability of data detection.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, a data slicer includes an analog to digital converter for sampling an input analog signal to convert it into a digital signal, a caption signal reader for determining upper/lower levels which are reference levels from the digital signal and detecting a signal of the line in which a caption data is inserted by applying a successive high/low detection manner to each of compared result between the digital signal and upper/lower level signals, a comparator for respectively comparing the digital signal with the upper/lower level signals and outputting the compared results to the caption signal reader, a data reader for outputting actual caption data by applying the successive high/low detection manner to the output of the comparator when a line signal in which the caption data is inserted is detected by the caption signal reader, and a controller for controlling the detection of the line signal in which the caption data is inserted, and a reading of the actual caption data.

The caption signal reader includes a reference level determination unit for detecting high/low peaks of the digital signals respectively and determining upper/lower levels which are reference levels by giving an offset to a difference of the two peak signals, a sinusoidal wave detector for storing and shifting the results of the comparator respectively, and for detecting a certain interval of an inherent 7-cycle sinusoidal wave of a caption signal in a successive high/low detection manner, and a start bit detector for storing and shifting the compared results of the comparator respectively, and for detecting a start bit inserted after the 7-cycle sinusoidal wave of the caption signal in a successive high/low detection manner, when the sinusoidal wave detector outputs a sinusoidal wave detection signal.

The reference level determination unit includes a high peak calculator for detecting a high peak of the digital signal, a low peak calculator for detecting a low peak of the digital signal, a difference calculator for calculating a difference between output values of the high and low peak calculators, a divider for outputting an offset value by dividing the resulted value from the difference calculator by a certain value, a mean value calculator for obtaining a mean value between the output values from the high and low peak calculators, and a level output unit for obtaining and outputting an upper-level by adding the offset value of the divider to the output value of the mean value calculator and a lower level by subtracting the offset value of the divider from the output value of the mean value calculator.

The sinusoidal wave detector includes a first shift register divided into several parts, for storing and shifting the result of comparison UHL between the digital signal and the upper level of the reference level determination unit, a second shift register divided into several parts, for storing and shifting the result of comparison LHL between the digital signal and the lower level of the reference level determination unit, a successive low discriminator for discriminating whether values of the divided parts of the first shift register are all in a low state, a successive high discriminator for discriminating whether values of the divided parts of the second shift register are all in a high state, a data determination unit for determining 1 or 0 utilizing the discriminated results of the successive low and high discriminators when a determination enable signal is input from the controller, a first register for storing an output value from the data determination unit, and a run-in signal output unit for outputting a run-in signal if the value stored in the first register is a part of the 7-cycle sinusoidal wave.

Each of the first and second shift registers is designed to have a size capable of storing digital data for a period of 1.5 cycle, and is divided into three regions.

Each divided region of the first and second shift registers sets specific regions having certain margins at its start and end points, so that the successive low and high discriminators discriminate successive low/high only for the data stored in the specific region.

The start bit detector includes a first shift register for storing and shifting the result of comparison UHL between the digital signal and the upper level of the reference level determination unit, having specific regions with certain margins at start and end points, a second shift register for storing and shifting the result of comparison LHL between the digital signal and the lower level of the reference level determination unit, having specific regions with certain margins at start and end points, a successive low discriminator for discriminating whether values of the specific regions of the first shift register are all in a low state, a successive high discriminator for discriminating whether values of the specific regions of the second shift register are all in a high state, a data determination unit for determining 1 or 0 utilizing the discriminated results of the successive low and high discriminators when a run-in signal is output from the sinusoidal wave detector, a first register for storing the output of the data determination unit, and a start bit output unit for outputting a start bit signal when the value stored in the first register is indicative of a start.

The data reader includes a first shift register for storing and shifting the result of comparison UHL between the digital signal and the upper level of the reference level determination unit, having specific regions with certain margins at start and end points, a second shift register for storing and shifting the result of comparison LHL between the digital signal and the lower level of the reference level determination unit, having specific regions with certain margins at start and end points, a successive low discriminator for discriminating whether values of the specific regions of the first shift register are all in a low state, a successive high discriminator for discriminating whether values of the specific regions of the second shift register are all in a high state, a data determination unit for determining 1 or 0 by the discriminated results of the successive low and high discriminators when a run-in signal and a start bit are output from the sinusoidal wave detector and the start bit detector, respectively, a second register for storing an output from the data determination unit, and a caption data output unit for reading an actual caption data stored in the second register by an output flag signal of the controller and externally outputting it.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 9 is a table illustrating a data determination method of a data determination unit in accordance with the embodiment of the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
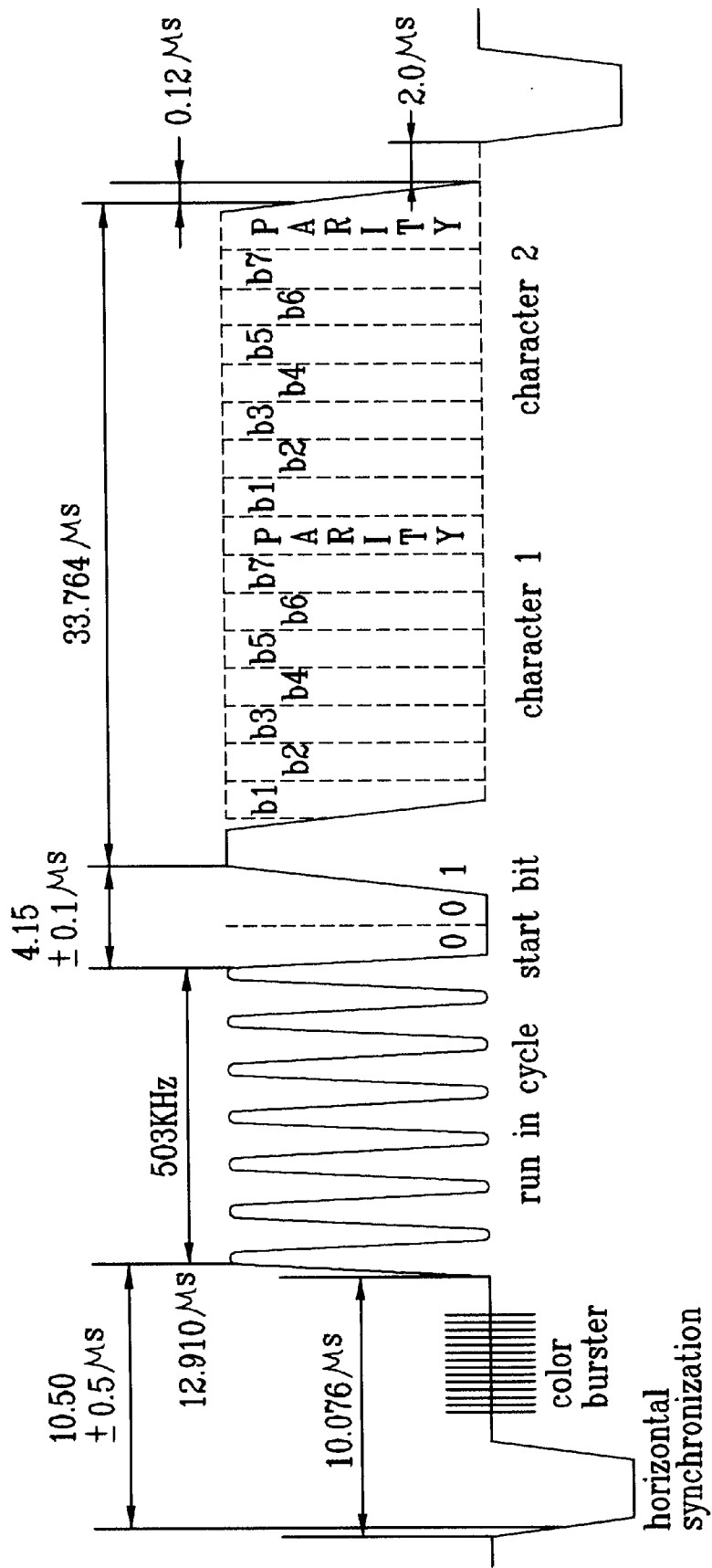
FIG. 1 is a timing chart of a general VBI line 21.
Figure 2:
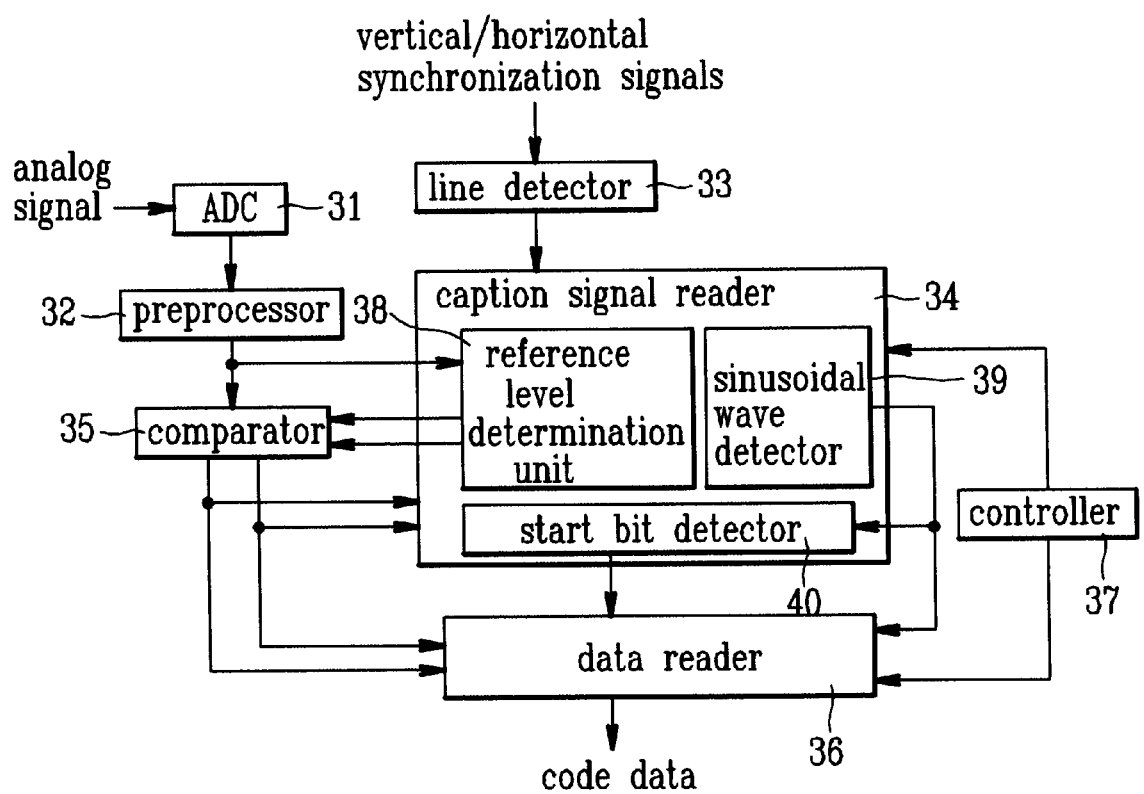
FIG. 2 is a block diagram showing the construction of a data slicer in accordance with an embodiment of the present invention.

FIG. 2 is a block diagram showing the construction of a data slicer in accordance with an embodiment of the present invention.

Referring to FIG. 2, the data slicer includes an analog to digital converter (ADC) 31 for sampling an input analog signal at a sampling frequency of 14.32 MHz, or a studio frequency, to convert it into a digital signal, a preprocessor 32 having a low pass filter for attenuating a noise component of an output signal from the ADC 31, a line detector 33 for detecting a VBI line 21 and two lines on the left and right of the VBI line 21 in response to vertical/horizontal synchronization signals, a caption signal reader 34 adapted to determine whether an output signal from the line detector 33 is a caption signal on the VBI line 21, a comparator 35 for comparing the level of an output signal from the preprocessor 32 respectively with upper/lower level signals output from the caption signal reader 34 and outputting upper high level (UHL)/lower high level (LHL) signals in accordance with the compared results, a data reader 36 adapted to process only data recognized as the caption signal by the caption signal reader 34 and outputting actual caption data, i.e., code data, in a successive high/low detection manner, and a first controller 37 for controlling the caption signal reader 34 and the data reader 36. All the components of the data slicer are operatively coupled.

The caption signal reader 34 includes a reference level determination unit 38 for detecting the upper/lower level signals as a reference level for determinating high or low of the preprocessed signal, a sinusoidal wave detector 39 for detecting an inherent 7-cycle sinusoidal wave of the caption signal in the successive high/low detection manner to provide a reference for determination about whether the currently sampled line is the VBI line 21, and a start bit detector 40 for detecting a start bit of the VBI line 21 in the successive high/low detection manner.

Figure 3:
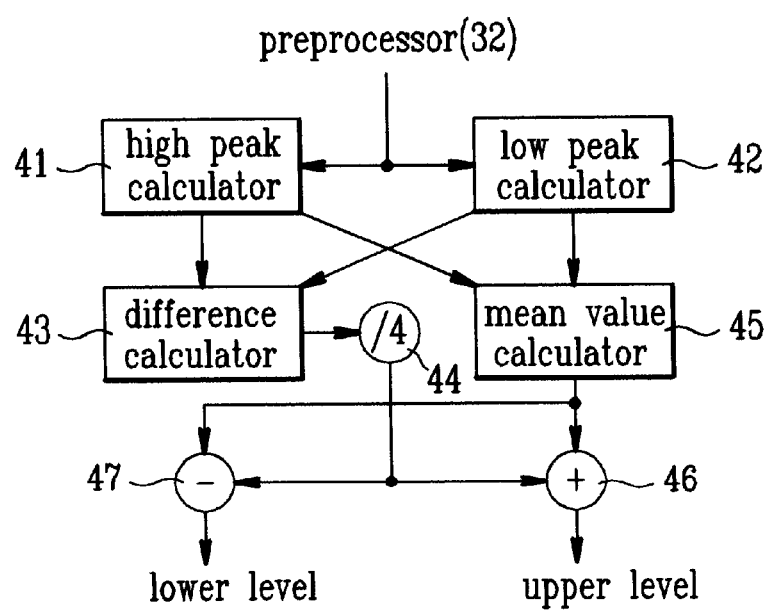
FIG. 3 is a detailed block diagram showing the construction of a reference level determination unit of FIG. 2 in accordance with the embodiment of the present invention.

As shown in FIG. 3, the reference level determination unit 38 includes a high peak calculator 41 for calculating a high peak of the output signal from the preprocessor 32, a low peak calculator 42 for calculating a low peak of the output signal from the preprocessor 32, a difference calculator 43 for calculating a difference between output values from the high peak and low peak calculators 41 and 42, a divider 44 adapted to divide an output value from the difference calculator 43 by 4 and output the divided result as an offset value, a mean value calculator 45 for obtaining a mean value of the output values from the high peak and low peak calculators 41 and 42, an adder 46 adapted to add an output value from the divider 44 to an output value from the mean value calculator 45 and output the added result as the upper level signal to the comparator 35, and a subtracter 47 for subtracting the output value of the divider 44 from the output value from the mean value calculator 45 and outputting the subtracted result as the lower level signal to the comparator 35.

Figure 4:
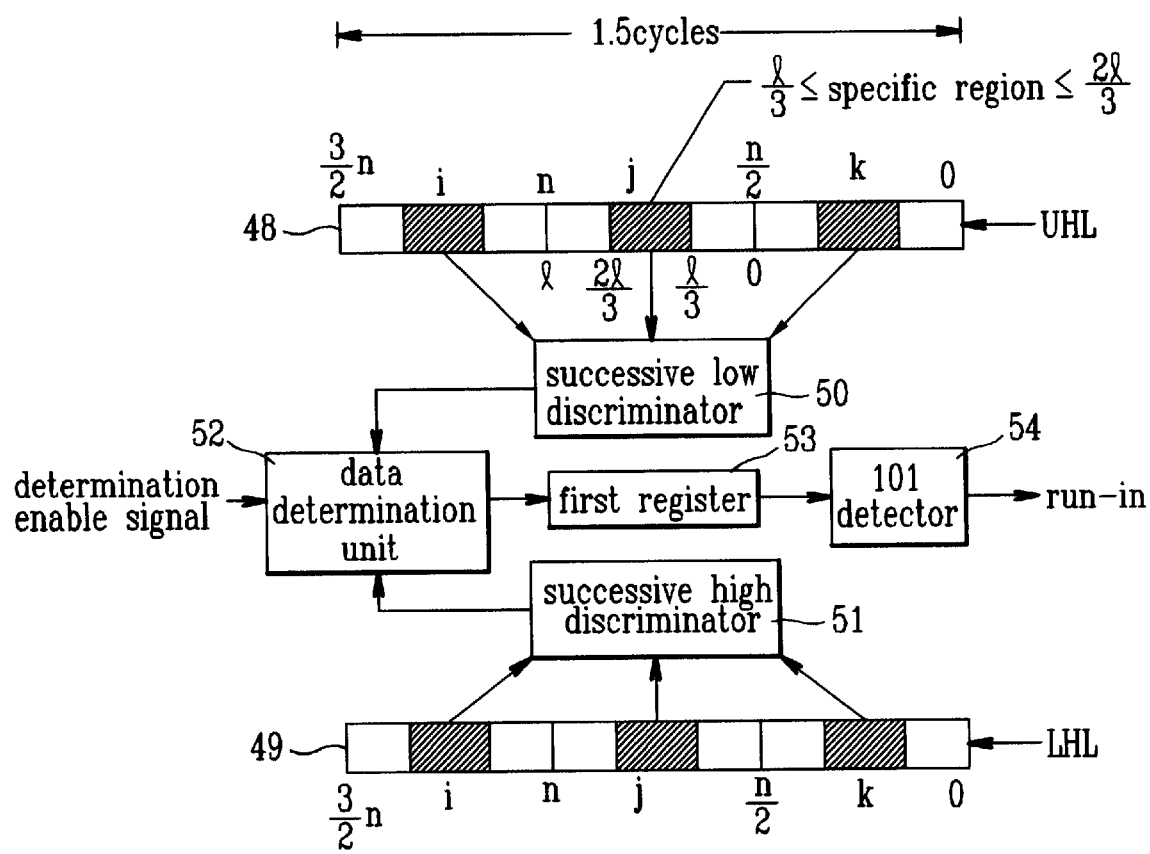
FIG. 4 is a detailed block diagram of a sinusoidal wave detector of FIG. 2 in accordance with the embodiment of the present invention.

With reference to FIG. 4, the sinusoidal wave detector 39 includes a first shift register 48 divided into three equal parts. The sinusoidal wave detector 39 is adapted to store and shift the result of comparison between the output signal from the preprocessor 32 and the upper level signal from the reference level determination unit 38, or the UHL signal of one bit from the comparator 35. The sinusoidal wave detector 39 further includes a second shift register 49 divided into three equal parts. The second shift register 49 is adapted to store and shift the result of comparison between the output signal from the preprocessor 32 and the lower level signal from the reference level determination unit 38, or the LHL signal of one bit from the comparator 35. The sinusoidal wave detector 39 further includes a successive low discriminator 50 for discriminating whether specific regions of the divided parts of the first shift register 48 are all "0", a successive high discriminator 51 for discriminating whether specific regions of the divided parts of the second shift register 49 are all "1", a data determination unit 52 operated in response to a determination enable signal from the first controller 37, for determining "1" or "0" using 5 output values from the successive low and high discriminators 50 and 51, a first register 53 adapted to store an output value from the data determination unit 52, having a 3-bit capacity, and a 101 detector 54 adapted to detect whether values stored in the first register 53 are "101" and output a run-in signal to the data reader 36 and the start bit detector 40 if the values stored in the first register 53 are "101".

Each of the first and second shift registers 48 and 49 is designed to have a size capable of storing sampled data for a period of 1.5 data cycles to detect the 7-cycle sinusoidal wave. In other words, a specific region of the 7-cycle sinusoidal wave, for example, a 1.5-cycle region is only observed to detect the 7-cycle sinusoidal wave. At this time, since the first and second shift registers 48 and 49 are divided into three parts, for example, each of the parts corresponds to a 0.5-cycle.

Also, the successive low discriminator 50 and the successive high discriminator 51 detect successive low or high from data stored in the specific regions in each of the parts. This is to improve reliability in detecting data such as sinusoidal wave, start bit, and caption data, so that signals to cross upper levels or lower levels and their adjacent signals are not used to detect data. At this time, it is desirable that each of the specific regions has a size which is smaller than the entire size of each of the divided shift register parts and greater than ⅓ thereof. For example, supposing that each of the divided parts has its start point "0" and its end point "1", the specific region is defined as 1l/3<specific region<2l/3.

Figure 5:
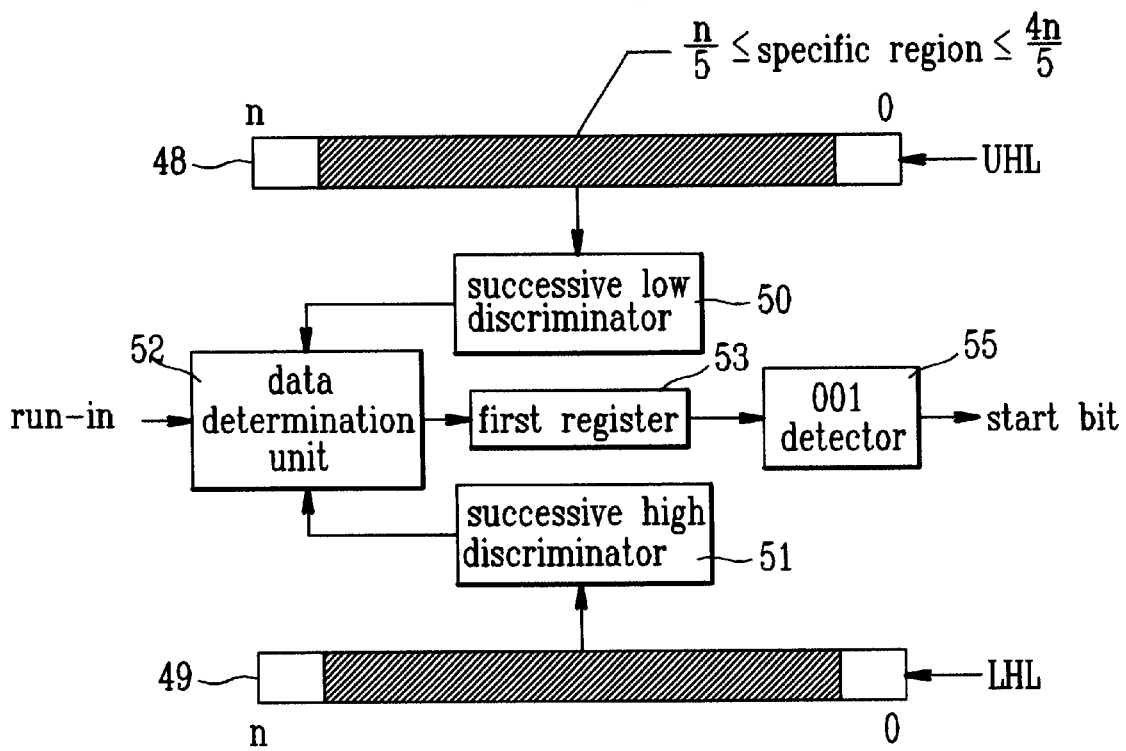
FIG. 5 is a detailed block diagram of a start bit detector of FIG. 2 in accordance with the embodiment of the present invention.

Meanwhile, as shown in FIG. 5, the start bit detector 40 is substantially the same in construction as the sinusoidal wave detector 39 of FIG. 4, with the exception that a 001 detector 55 is provided instead of the 101 detector 54 and each of the specific regions of the first and second shift registers 48 and 49 has a size which is smaller than the entire size of each shift register and greater than ⅗ thereof, preferably, 1n/5<specific region<4n/5. The 001 detector 55 outputs the start bit to the data reader 36 if the values stored in the first register 53 are "001".

Figure 6:
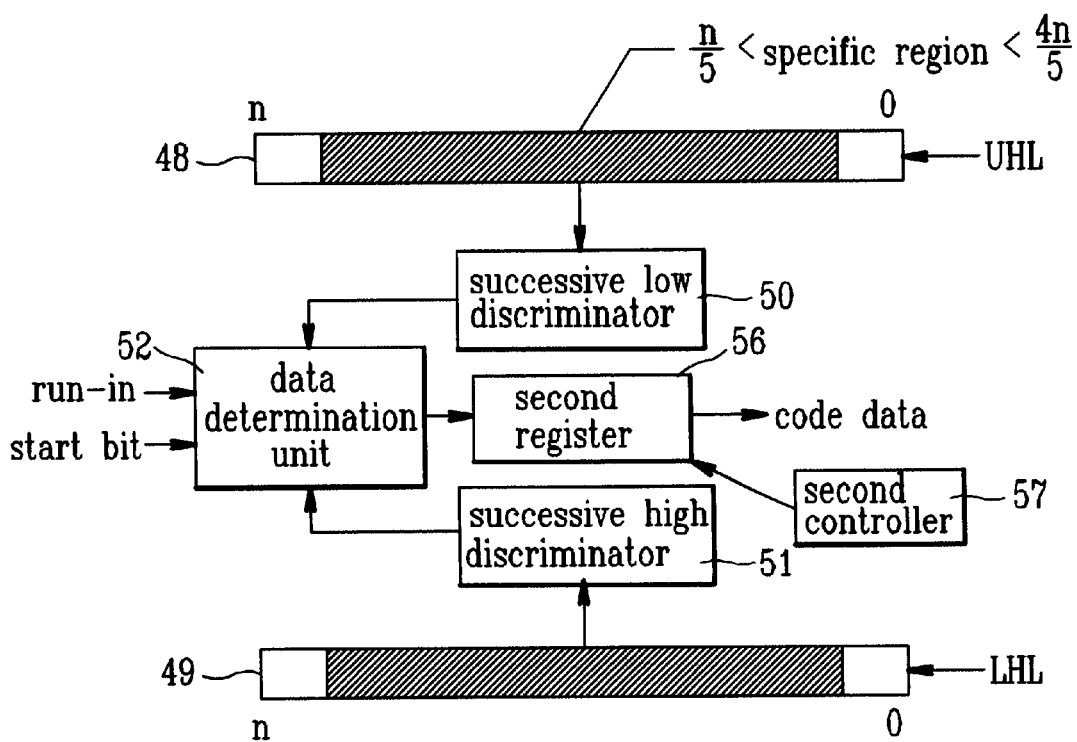
FIG. 6 is a detailed block diagram of a data reader of FIG. 2 in accordance with the embodiment of the present invention.

With reference to FIG. 6, the data reader 36 Is substantially the same in construction as the start bit detector 40 of FIG. 5, with the exception that a second register 56 with an 8-bit capacity is provided instead of the first register 53 with the 3-bit capacity, and a second controller 57 is further provided to output an output flag signal to the second register 56 to control it. The second register 56 is operative in response to the output flag signal from the second controller 57 to output the caption data of 2 bytes per frame externally. At this time, in the same manner as FIG. 5, each of the specific regions of the first and second shift registers 48 and 49 has a size which is smaller than the entire size of each shift register and greater than ⅗ thereof, preferably, 1n/5<specific region<4n/5.

The first and second shift registers 48 and 49, the successive low discriminator 50, the successive high discriminator 51, the data determination unit 52, and the first register 53 may be used in common in the sinusoidal wave detector 39, the start bit detector 40, and the data reader 36, or they may separately be provided and used in each block.

The operation of the data slicer with the above-mentioned construction in accordance with the embodiment of the present invention will hereinafter be described in detail.

First, upon inputting an analog signal, the ADC 31 samples the analog signal at the sampling frequency of 14.32 MHz, which is the studio frequency, or at any other appropriate frequency.

The preprocessor 32 attenuates a noise component of the sampled signal from the ADC 31 through the low pass filter and outputs the resultant signal to the comparator 35 and the reference level determination unit 38 of the caption signal reader 34.

For the purpose of preventing a faulty operation due to a synchronization delay based on a signal modification, the line detector 33 detects the VBI line 21 and two lines on the left and right of the VBI line 21 in response to the vertical/horizontal synchronization signals and outputs the detected results to the caption signal reader 34.

The reference level determination unit 38 detects upper/lower level signals, or reference level signals from the sinusoidal wave signal preprocessed by the preprocessor 32 and outputs the detected upper/lower level signals to the comparator 35.

The kernel of the reference level determination method is to obtain the upper/lower levels, with an offset value in a desired ratio to a difference between the highest and lowest values of input data, for the application of the successive high/low determination manner.

The high and low peak calculators 41 and 42 of the reference level determination unit 38 respectively detect a high peak signal and a low peak signal of output signals from the preprocessor 32 and output the detected signal to the difference calculator 43 and the mean value calculator 45.

The difference calculator 43 obtains a difference between the high peak signal and the low peak signal and outputs it to the divider 44. The divider 44 divides an output value from the difference calculator 43 by 4 and outputs the divided result as an offset value to the adder 46 and the subtracter 47. The mean value calculator 45 obtains a mean value of the output values from the high peak and low peak calculators 41 and 42 and outputs the mean value to the adder 46 and the subtracter 47.

The adder 46 adds an output value from the divider 44 to an output value from the mean value calculator 45 and output the added result to the comparator 35. The subtracter 47 subtracts the output value of the divider 44 from the output value from the mean value calculator 45 and outputs the subtracted result to the comparator 35. The output value of the adder 46 is upper level while the output value of the subtracter 47 is lower level.

The comparator 35 compares the level of the output signal from the preprocessor 32 respectively with the output signals, i.e., upper/lower level signals, from the reference level determination unit 38 and outputs UHL/LHL signals as a result of the comparison to the data reader 36, the sinusoidal wave detector 39 and the start bit detector 40.

In the sinusoidal wave detector 39, the UHL signal from the comparator 35 is stored and shifted in the first shift register 48 divided into three equal parts, and the LHL signal from the comparator 35 is stored and shifted in the second shift register 49 divided into three equal parts. The UHL and LHL signals are shifted to the left whenever a clock (not shown) is input.

The successive low discriminator 50 discriminates whether data in specific regions of the divided parts of the first shift register 48 are all "0". If the data are all "0", the successive low discriminator 50 outputs low signal to the data determination unit 52. If the data are not all "0", that is, at least one or more data are "1", the successive low discriminator 50 outputs high signal to the data determination unit 52. The successive low discriminator 50 discriminates successive low separately for the divided parts, i part, j part and k part of the first shift register 48. For example, if the data in a specific region of the i part are all "0", the successive low discriminator 50 outputs low signal. If the data in a specific region of the i part are not all "0", the successive low discriminator 50 outputs high signal. For the j and k parts, the successive low discriminator 50 separately discriminates regardless of the i part whether the data for each part are all "0" and outputs the result to the data determination unit 52.

The successive high discriminator 51 discriminates whether specific regions of the divided parts of the second shift register 49 are all "1" in the same manner as the successive low determination unit 50.

Figure 7:
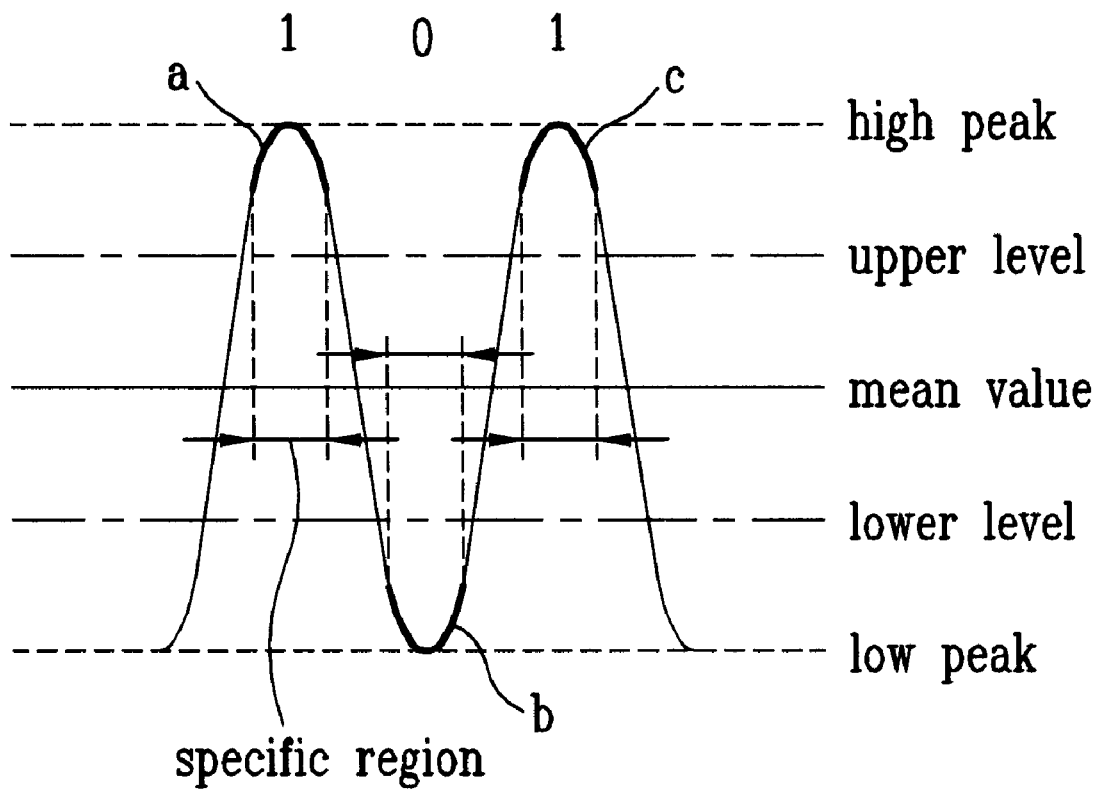
FIG. 7 is a waveform showing reference level determination steps in accordance with the embodiment of the present invention.

For example, if data in a specific region of a waveform a of FIG. 7 is respectively compared with upper/lower levels, the compared result, i.e., UHL and LHL values become all "1" because the data in the specific region is always higher than the upper/lower levels. At this time, it is assumed that the data has no error. Likewise, in a waveform c of FIG. 7, UHL and LHL values become all "1".

On the other hand, if data in a specific region of a waveform b of FIG. 7 is respectively compared with the upper/lower levels, the compared result, i.e., UHL and LHL values become all "0" because the data in the specific region is always lower than the upper/lower levels.

It is assumed that the compared result(i.e., UHL/LHL=1) in the waveform a is stored in the specific region of the i part of the first and second shift registers 48 and 49, the compared result(i.e., UHL/LHL=0) in the waveform b is stored in the specific region of the j part thereof, and the compared result (i.e., UHL/LHL=1) in the waveform c is stored in the k part thereof. In this case, in the i and k parts, the successive low discriminator 50 outputs a signal which is not low, and the successive high discriminator 51 outputs a high signal. In the j part, the successive low discriminator 50 outputs a low signal and the successive high discriminator 51 outputs a signal which is not high.

Then, in response to the determination enable signal from the first controller 37, the data determination unit 52 stores output values from the successive low and high discriminators 50 and 51 into the first 3-bit register 53 after determining the output data as shown in FIG. 9. The 101 detector 54 detects whether the values stored in the first register 53 are "101".

In other words, if the successive low discriminator 50 outputs a high signal and the successive high discriminator 51 outputs a low signal, the data determination unit 52 outputs "1" to store it in the first register 53. On the contrary, if the successive low discriminator 40 outputs a low signal and the successive high discriminator 51 outputs a low signal, the data determination unit 52 outputs "0" to store it in the first register 53. The other states are ignored.

Supposing that, as shown in FIG. 7, the waveforms a, b and c are sequentially stored in the respective specific regions of the first and second shift registers 48 and 49, and the successive low discriminator 50 and the successive high discriminator 51 output the determination results as above, the data stored in the first register 53 through the data determination unit 52 become 101. In the present invention, to detect the sinusoidal wave region, some of the 7-cycle sinusoidal wave, for example, 1.5-cycle is only used. When the 1.5-cycle is high/low/high state as shown in FIG. 7, the sinusoidal wave region is detected. At this time, the number of cycles used for detection and shapes of the cycle depend on a designer.

Therefore, if the values stored in the first register 53 are "101", the 101 detector 54 outputs the run-in signal to the data reader 36 and the start bit detector 40.

At this time, it is desirable that each of the specific regions has a size which is smaller than the entire size of each of the divided shift register parts and greater than $1/3$ thereof.

For example, supposing that each of the divided parts has its start point "0" and its end point "1", the specific region is defined as $1l/3 <$ specific region $< 2l/3$.

Alternatively, as other embodiment of the present invention, the 101 detector 54 may output the run-in signal to the data reader 36 and the start bit detector 40 if the "010" is detected in the first register 53. In this case, the 010 detector is used instead of the 101 detector.

Meanwhile, as shown in FIG. 5, the start bit detector 40 detects the start bit from the UHL and LHL values stored in the first and second shift registers 48 and 49 as a result of the comparator 35 in the successive low and high detection manner.

In other words, in the same manner as the sinusoidal wave detector 39, the successive low discriminator 50 discriminates whether data stored in a specific region of the first shift register 48 is "0", and the successive high discriminator 51 discriminates whether data stored in a specific region of the second shift register 49 is "1". The results discriminated by the successive low and high discriminators 50 and 51 are output to the data determination unit 52. Here, each of the specific regions has a size which is smaller than the entire size of each shift register and greater than ⅗ thereof, namely, 1n/5<specific region<4n/5.

At this time, if the run-in signal is input from the sinusoidal wave detector, the data determination unit 52 determines output data from the output signals from the successive low discriminator 50 and successive high discriminator 51 as shown in FIG. 9 and stores the determined data in the first register 53. For example, if high signal is input from the successive low discriminator 50 and high signal is input from the successive high discriminator 51, the output data "1" is determined and then stored in the first register 53.

If the values stored in the first register 53 are "001", the 001 detector 55 outputs the start bit to the data reader 36.

Meanwhile, the data reader 36 outputs actual caption data if the start bit is detected by the start bit detector 40. For this, as shown in FIG. 6, the successive low discriminator 50 of the data reader 36 discriminates whether data stored in a specific region of the first shift register 48 are all "0", and the successive high discriminator 51 discriminates whether data stored in a specific region of the second shift register 49 are all "1". The results discriminated by the successive low and high discriminators 50 and 51 are output to the data determination unit 52. Here, each of the specific regions has a size which is smaller than the entire size of each shift register and greater than ⅗ thereof.

At this time, if the run-in signal is input from the sinusoidal wave detector 39 and the start signal is input from the start bit detector 40, the data determination unit 52 stores output values from the successive low and high discriminators 50 and 51 in the second 8-bit register 56. The second register 56 outputs the caption data of 2 bytes per frame in response to the output flag signal from the second controller 57.

Figure 8A:
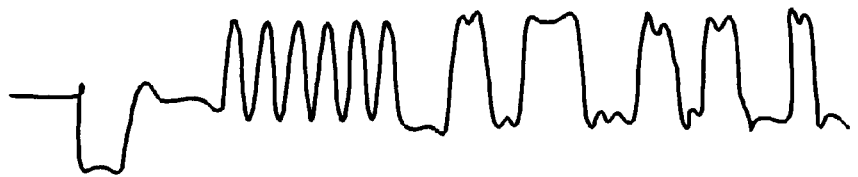
FIGS. 8a to 8d are waveforms of a normal VBI line 21 caption signal, a distorted signal and the surrounding noise signals.
Figure 8B:
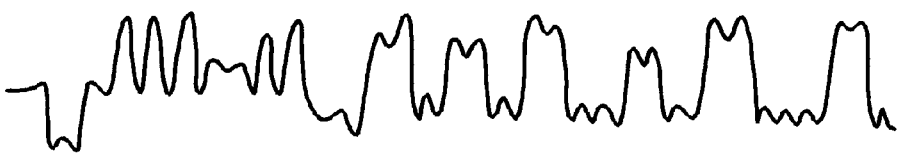

As stated previously, in the conventional data slicer where the 7-cycle sinusoidal wave on the VBI line 21 is used for the frequency/phase locking of the PLL, if a distorted caption signal as shown in FIG. 8b is input, the frequency locking is not effected due to the application of the PLL technique, resulting in the occurrence of a faulty operation.

Figure 8C:
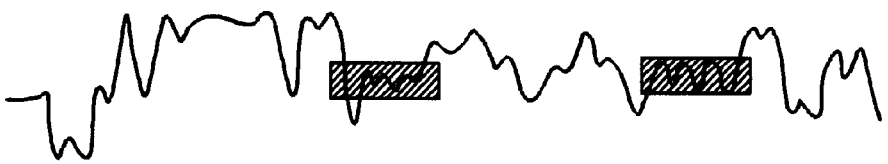
Figure 8D:

Also, in another conventional data slicer where the 7-cycle sinusoidal wave on the VBI line 21 is used as the sample/hold interval for the detection of the reference voltage for the high/low determination, the 1/0 counting and comparing operations are performed, resulting in a degradation in noise coping capability. As a result, the conventional data slicer may mis-recognize a video signal deteriorated due to noise signals surrounding the VBI line 21, as shown in FIGS. 8c and 8d, as the caption signal, thereby causing a faulty operation of the caption decoder.

However, in the present data slicer where a part of the 7-cycle sinusoidal wave on the VBI line 21 is used as the interval for the detection of the upper/lower levels as the reference levels, the data detection operation is performed in the successive high/low detection manner. Therefore, the present data slicer can recognize only a normal caption signal as shown in FIG. 8a without mis-recognizing the distorted caption signal and the noise signals surrounding the VBI line 21 as the caption signal. As a result, the present data slicer does not cause any faulty operation.

As apparent from the above description, according to the present invention, the data detection operation is performed in the successive high/low detection manner where a part of the 7-cycle sinusoidal wave on the VBI line 21 is used as the interval for the detection of the upper/lower levels as the reference levels. Therefore, a separate PLL is not required, so that H/W can be reduced in size and cost and a faulty operation can be prevented from occurring due to a self-deterioration of the 7-cycle sinusoidal wave or a noise waveform distorted in an analogous form to the caption signal, thereby improving the reliability of caption data detection.

It will be apparent to those skilled in the art that various modifications and variations can be made in the data slicer according to the present invention without departing from the spirit or scope of the invention. Thus, it is intended that the present invention covers the modifications and variations of the invention provided they come within the scope of the appended claims and their equivalents.

What is claimed is:

1. A data slicer comprising:
    an analog to digital converter for sampling an input analog signal to convert the analog signal into a digital signal;
    a caption signal reader for determining upper/lower levels which are reference levels from the digital signal and detecting a line signal in which a caption data is inserted by applying a successive high/low detection manner to each of compared result between the digital signal and upper/lower level signals;
    a comparator for respectively comparing the digital signal with the upper/lower level signals and outputting the compared results to the caption signal reader;
    a data reader for outputting actual caption data by applying the successive high/low detection manner to the output of the comparator when the line signal in which the caption data is inserted is detected by the caption signal reader; and
    a controller for controlling the detection of the line signal in which the caption data is inserted, and a reading of the actual caption data.

2. The data slicer as set forth in claim 1, wherein the analog-to-digital converter includes a preprocessor for attenuating noise components of the digital signal.

3. The data slicer as set forth in claim 1, wherein the caption signal reader includes:
    a reference level determination unit for detecting high/low peaks of the digital signal respectively and determining upper/lower levels which are reference levels by giving an offset to a difference of the peak signals;
    a sinusoidal wave detector for storing and shifting the results of the comparator respectively, and for detecting a certain interval of an inherent 7-cycle sinusoidal wave of a caption signal in a successive high/low detection manner; and
    a start bit detector for storing and shifting the compared results of the comparator respectively, and for detecting a start bit inserted after the 7-cycle sinusoidal wave of the caption signal in a successive high/low detection manner, when the sinusoidal wave detector outputs a sinusoidal wave detection signal.

4. The data slicer as set forth in claim 3, wherein the reference level determination unit includes:
   a high peak calculator for detecting a high peak of the digital signal;
   a low peak calculator for detecting a low peak of the digital signal;
   a difference calculator for calculating a difference between output values of the high and low peak calculators;
   a divider for outputting an offset value by dividing the resulted value from the difference calculator by a certain value;
   a mean value calculator for obtaining a mean value between the output values from the high and low peak calculators; and
   a level output unit for obtaining and outputting an upper-level by adding the offset value of the divider to the output value of the mean value calculator and a lower level by subtracting the offset value of the divider from the output value of the mean value calculator.

5. The data slicer as set forth in claim 4, wherein the certain value of the divider is a constant "4".

6. The data slicer as set forth in claim 3, wherein the sinusoidal wave detector includes:
   a first shift register divided into parts, for storing and shifting the result of comparison UHL between the digital signal and the upper level of the reference level determination unit;
   a second shift register divided into parts, for storing and shifting the result of comparison LHL between the digital signal and the lower level of the reference level determination unit;
   a successive low discriminator for discriminating whether values of the divided parts of the first shift register are all in a low state;
   a successive high discriminator for discriminating whether values of the divided parts of the second shift register are all in a high state;
   a data determination unit for determining 1 or 0 utilizing the discriminated results of the successive low and high discriminators when a determination enable signal is input from the controller;
   a first register for storing an output value from the data determination unit; and
   a run-in signal output unit for outputting a run-in signal if the value stored in the first register is a part of the 7-cycle sinusoidal wave.

7. The slicer as set forth in claim 6, wherein the first shift register is designed to have a size capable of storing digital data for a period of 1.5 cycle, and is divided into three regions.

8. The slicer as set forth in claim 7, wherein each divided part of the first shift register sets specific regions having certain margins at start and end points of said divided part, so that the successive low discriminator discriminates a successive low only for the data stored in the specific region.

9. The data slicer as set forth in claim 8, wherein each of the specific regions has a size which is smaller than the entire size of each of the divided shift register parts and greater than ⅓ thereof, namely, 1l/3<specific region<2l/3 supposing that each of the divided parts has a start point "0" and an end point "1".

10. The data slicer as set forth in claim 6, wherein the second shift register is designed to have a size capable of storing digital data for a period of 1.5 cycle, and is divided into three regions.

11. The slicer as set forth in claim 10, wherein each divided part of the second shift register sets specific regions having certain margins at start and end points of said divided part, so that the successive high discriminator discriminates a successive high only for the data stored in the specific region.

12. The data slicer as set forth in claim 11, wherein each of the specific regions has a size which is smaller than the entire size of each of the divided shift register parts and greater than ⅓ thereof, namely, 1l/3<specific region<2l/3 supposing that each of the divided parts has a start point "0" and an end point "1".

13. The data slicer as set forth in claim 6, wherein the data determination unit determines output data "0" if the successive low discriminator discriminates that data of the specific regions are all in a low state and the successive high discriminator discriminates that data of the specific regions are not all in a high state, and determines output data "1" if the successive high discriminator discriminates that data of the specific regions are not all in a low state and the successive high discriminator discriminates that data of the specific regions are all in a high state.

14. The data slicer as set forth in claim 6, wherein the run-in signal output unit outputs the run-in signal if the data stored in the first register are "101".

15. The data slicer as set forth in claim 6, wherein the run-in signal output unit outputs the run-in signal if the data stored in the first register are "010".

16. The data slicer as set forth in claim 3, wherein the start bit detector includes:
   a first shift register for storing and shifting the result of comparison UHL between the digital signal and the upper level of the reference level determination unit, having specific a second shift register for storing and shifting the result of comparison LHL between the digital signal and the lower level of the reference level determination unit, having specific regions with certain margins at start and end points;
   a successive low discriminator for discriminating whether values of the specific regions of the first shift register are all in a low state;
   a successive high discriminator for discriminating whether values of the specific regions of the second shift register are all in a high state;
   a data determination unit for determining 1 or 0 utilizing the discriminated results of the successive low and high discriminators when a run-in signal is output from the sinusoidal wave detector;
   a first register for storing the output of the data determination unit; and
   a start bit output unit for outputting a start bit signal when the value stored in the first register is indicative of a start.

17. The data slicer as set forth in claim 16, wherein each of the specific regions of the first and second shift registers has a size which is smaller than the entire size of each of the first and second shift registers and greater than ⅗.

18. The data slicer as set forth in claim 3, wherein the data reader includes:
   a first shift register for storing and shifting the result of comparison UHL between the digital signal and the upper level of the reference level determination unit, having specific regions with certain margins at start and end points;

a second shift register for storing and shifting the result of comparison LHL between the digital signal and the lower level of the reference level determination unit, having specific regions with certain margins at start and end points;

a successive low discriminator for discriminating whether values of the specific regions of the first shift register are all in a low state;

a successive high discriminator for discriminating whether values of the specific regions of the second shift register are all in a high state;

a data determination unit for determining 1 or 0 by the discriminated results of the successive low and high discriminators when a run-in signal and a start bit are output from the sinusoidal wave detector and the start bit detector, respectively;

a second register for storing an output from the data determination unit; and a caption data output unit for reading an actual caption data stored in the second register by an output flag signal of the controller and externally outputting the actual caption data.

19. The data slicer as set forth in claim 18, wherein each of the specific regions of the first and second shift registers has a size which is smaller than the entire size of each of the first and second shift registers and greater than ⅗.

20. A data slicer comprising:

a caption signal reader for determining upper/lower levels which are reference levels from a digital signal and detecting a line signal in which a caption data is inserted by applying a successive high/low detection manner to each of compared result between the digital signal and upper/lower level signals;

a comparator for respectively comparing the digital signal with the upper/lower level signals and outputting the compared results to the caption signal reader; and a data reader for outputting actual caption data by applying the successive high/low detection manner to the output of the comparator when the line signal in which the caption data is inserted is detected by the caption signal reader.

21. The data slicer as set forth in claim 20, wherein the caption signal reader includes:

a reference level determination unit for detecting high/low peaks of the digital signal respectively and determining upper/lower levels which are reference levels by giving an offset to a difference of the peak signals;

a sinusoidal wave detector for storing and shifting the results of the comparator respectively and for detecting a certain interval of an inherent sinusoidal wave of a caption signal in a successive high/low detection manner; and a start bit detector for storing and shifting the compared results of the comparator respectively and for detecting a start bit inserted after the inherent sinusoidal wave of the caption signal in a successive high/low detection manner, when the sinusoidal wave detector outputs a sinusoidal wave detection signal.

* * * * *